(12) United States Patent
Mruczek

(10) Patent No.: US 11,189,998 B2
(45) Date of Patent: Nov. 30, 2021

(54) APPARATUS FOR ELECTRICALLY INTERCONNECTING TWO LAMINATED MULTI-PHASE BUSBARS

(71) Applicant: ABB Schweiz AG, Baden (CH)

(72) Inventor: Maciej Mruczek, Cracow (PL)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 17/223,033

(22) Filed: Apr. 6, 2021

(65) Prior Publication Data

US 2021/0226434 A1 Jul. 22, 2021

Related U.S. Application Data

(63) Continuation of application No. PCT/EP2018/079332, filed on Oct. 25, 2018.

(51) Int. Cl.
*H02G 5/00* (2006.01)
*H02B 13/00* (2006.01)

(52) U.S. Cl.
CPC .......... *H02G 5/005* (2013.01); *H02B 13/005* (2013.01); *H02G 5/007* (2013.01)

(58) Field of Classification Search
CPC .......... H02G 5/06; H02G 5/005; H02G 5/025; H02G 1/14; H02G 5/00; H02G 5/007; H02G 5/002; H05K 5/00; H05K 5/02; H05K 5/0069; H05K 7/00; H01B 1/026; H01B 7/02; H02B 1/20; H02B 1/205; H02B 1/207; H02B 1/21; H02B 1/22; H02B 1/30; H02B 13/005

USPC ...... 174/72 B, 71 B, 68.2, 88 B, 70 B, 99 B, 174/541, 528; 439/212, 213; 361/600, 361/611, 601, 624, 637, 648, 679.01, 775
See application file for complete search history.

(56) References Cited

U.S. PATENT DOCUMENTS

RE26,310 E * 11/1967 Moodie et al. ........ H02G 5/007
174/68.2
3,609,215 A * 9/1971 Giger, Jr. ............... H02G 5/002
174/88 B (Continued)

FOREIGN PATENT DOCUMENTS

DE 102005015945 B4 7/2015
WO WO 2019201419 A1 10/2019

*Primary Examiner* — Angel R Estrada
(74) *Attorney, Agent, or Firm* — Leydig, Voit & Mayer, Ltd.

(57) ABSTRACT

An apparatus for electrically connecting busbars includes: a first laminated multi-phase busbar to be connected to a second laminated multi-phase busbar, each of the first and second laminated multi-phase busbars including a plurality of conducting layers and insulating layers which are arranged between the conducting layers, the conducting layers of the first laminated multi-phase busbar projecting from the insulating layers thereof, forming a first lateral connecting portion with first electrical contact surfaces, and the conducting layers of the second laminated multi-phase busbar projecting from the insulating layers thereof, forming a second lateral connecting portion with second electrical contact surfaces; and a bridging element that includes a plurality of laminated insulating layers and conducting layers having electrical contact surfaces which contact associated electrical contact surfaces of the first and second lateral connecting portions of the first and second busbar.

10 Claims, 4 Drawing Sheets

(56) References Cited

U.S. PATENT DOCUMENTS

| | | | | |
|---|---|---|---|---|
| 4,174,143 | A * | 11/1979 | Hicks, Jr. | H02G 5/007 174/88 B |
| 4,627,680 | A * | 12/1986 | Weimer | H02G 5/007 174/88 B |
| 5,760,339 | A * | 6/1998 | Faulkner | H01R 25/162 174/88 B |
| 7,819,681 | B1 | 10/2010 | Rodrigues et al. | |
| 8,550,830 | B1 * | 10/2013 | Bhathija | H01R 31/02 439/213 |
| 10,411,453 | B1 * | 9/2019 | Wiant | H02B 1/21 |
| 10,707,631 | B2 * | 7/2020 | Kokenda | H02G 5/002 |

* cited by examiner

APPARATUS FOR ELECTRICALLY INTERCONNECTING TWO LAMINATED MULTI-PHASE BUSBARS

CROSS-REFERENCE TO PRIOR APPLICATION

This application is a continuation of International Patent Application No. PCT/EP2018/079332, filed on Oct. 25, 2018, the entire disclosure of which is hereby incorporated by reference herein.

FIELD

The invention is related to an apparatus for electrically interconnecting two laminated multi-phase busbars as described herein and a switchgear cabinet including such an apparatus as described herein.

BACKGROUND

Multi-phase busbars are used in low voltage switchgears to conduct and distribute alternating electrical current to different electrical devices which are installed in switch gear cabinets. In order to conduct all three or even more phases of an alternating current in a single busbar, laminated multi-phase busbars have been developed which comprise a base layer and a cover layer of electrically insulating material between which two or more layers of conducting sheet metal, in particular copper sheets, are arranged which are electrically insulated from each other by means of insulating layers located in between two conducting layers.

An afore-described busbar in which the different layers are laminated to each other by means of liquid resin is described in DE 10 2005 015 945 B4 of the applicant. The described laminated multi-phase busbar has the advantage that it has a compact design and does not tend to delaminate due to repellant forces which are generated by the alternating electric currents which are conducted in the different conducting layers for each phase and which in case of a short circuit can be in the range of several thousand ampere (kA).

In order to supply electric energy from a power source to a laminated multi-phase busbar, it is known to remove the insulating material in a lateral section of the sandwich of layers and expand the uncoated conducting layers which project from the insulating layers, so as to provide for four lateral connecting portions, that is one for each phase and one for protective earth, to which the terminals of the electric power source can be connected. The conducting layers and the contact sections provided thereat, are preferably made of copper and may have a thickness in the range between 0.5 and 2.0 mm.

The lateral connecting portions are also used to provide an electrical connection between different busbars in two or more switch gear cabinets which are arranged side by side in a row in order to efficiently feed the electric energy from a power source to the busbars of two or more interconnected switchgear cabinets. Moreover, the lateral connecting portions also serve to reduce the lengths of laminated busbars because long busbars for large switchgear cabinets can be spilt up into a plurality of shorter busbar sections which after shipping from the manufacturer are joined at the customer site in order to ease handling and reduce transportation costs. In view of this, the electrical connecting portions are also designated as shipping splits.

The electrical connection of the conducting layers of one busbar or busbar section to the conducting layers of an adjoining busbar or bus bar section at the lateral connecting portions is usually done by means of a bridging element, which has substantially the same laminated sandwich structure as the busbars, and which is mounted in a free space, which is provided between the connecting portions of two neighboring busbars.

One problem, which arises when using an electrical bridging elements for connecting the lateral connecting portions of two adjoining laminated multi-phase busbars, can be seen in that when connecting the shipping splits of the busbars and bridging element by means of a front and a back pressure plate and a bolt element and which directly extends through a common central hole in the different laminated layers and the clamping plates, a high local pressure is exerted to the different layers of the busbar, which rapidly drops in a radial direction from the center of the bolt. Due to this rapid drop of contacting pressure the insulating material of the laminated busbar becomes deformed, so that no long-term gas tight joint of the overlapping electric contact members can be achieved.

Moreover, the rapid drop of contacting pressure further makes it necessary to provide a higher density of clamping plates along the length of the shipping splits, which in turn increases cost for material and installation.

Non published PCT/EP2018/059642 discloses an apparatus for electrically interconnecting the lateral contacting portions of two laminated multi-phase busbars by means of a bridging element. The apparatus comprises two stiff clamping plates on the front side and two stiff clamping plates on the back side of the busbars, which are positioned above each lateral contacting portion. The stiff clamping plates are pivotally mounted to associated pressure transfer elements on the front side and back side and are urged towards each other by at least one tension bolt, which extends through a hole in the bridging element from the pressure transfer element on the front side to the pressure transfer element on the back side of the busbars. The stiff clamping plates evenly distribute the pressure over the entire area of the lateral contacting portions and therefore require a high force to be applied by the clamping plates. Due to the stiff construction of the clamping plates, variations in thickness of the busbars, which are caused by manufacturing tolerances, cannot be compensated for, so that the clamping forces in areas of the lateral contacting portions having reduced thickness are reduced, which in turn may result in electrical contact issues.

SUMMARY

In an embodiment, the present invention provides an apparatus for electrically connecting busbars, comprising: a first laminated multi-phase busbar configured to be connected to a second laminated multi-phase busbar, each of the first and second laminated multi-phase busbars including a plurality of conducting layers and insulating layers which are arranged between the conducting layers, the conducting layers of the first laminated multi-phase busbar projecting from the insulating layers thereof, forming a first lateral connecting portion with first electrical contact surfaces, and the conducting layers of the second laminated multi-phase busbar projecting from the insulating layers thereof, forming a second lateral connecting portion with second electrical contact surfaces; a bridging element that includes a plurality of laminated insulating layers and conducting layers having electrical contact surfaces which are configured to contact associated electrical contact surfaces of the first and second lateral connecting portions of the first and second busbar; a first pressure distribution plate configured to be arranged on a first side of the busbars; a second pressure distribution plate configured to be arranged on a second side of the busbars; and a tensioning bolt configured to extend through a central opening formed in the first and second pressure distribution plates and the bridging element, configured to urge the first and second pressure distribution plates towards each other, wherein the first and second pressure distribution plates each comprise a plurality of pressure transfer elements which are pivotally mounted to the pressure distribution plates, and wherein each pressure transfer element comprises a contact area configured to locally contact an outer surface area of the bridging element which matches a position of an associated electrical contact surface of the first and second lateral connecting portions.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides an apparatus for interconnecting the lateral connecting portions of a first and a second adjoining laminated multiphase busbar which allows for a compensation of thickness tolerances of the busbars and a reduced overall pressure to be applied to the lateral connecting portions of the busbar.

In an embodiment, the present invention provides a switch gear cabinet with a first busbar, a second busbar and a connecting apparatus which overcomes the afore-described problems.

According to the invention a first and a second laminated multi-phase busbar include a plurality of conducting layers and insulating layers which are arranged between the conducting layers. The conducting layers of the first laminated multi-phase busbar project or protrude from the insulating layers thereof, forming a first lateral connecting portion with first electrical contact surfaces. The conducting layers of the second laminated multi-phase busbar project from the insulating layers thereof, thereby forming a second lateral connecting portion with second electrical contact surfaces. For mechanically and electrically connecting the first multi-phase busbar to the second laminated multi-phase busbar, an apparatus of the invention comprises a bridging element which includes a plurality of laminated insulating layers and conducting layers which have electrical contact surfaces that are adapted to contact associated electrical contact surfaces provided at the first and second lateral connecting portions of an associated busbar.

The apparatus further comprises a first pressure distribution plate which is adapted to be arranged on a first side of the busbars and a second pressure distribution plate which is adapted to be located on a second side of the busbars. Moreover, the apparatus comprises a tensioning bolt which is adapted to extend through a central opening which is formed in the first and second pressure distribution plates and also in the bridging element, for urging the first and second pressure distribution plates towards each other.

The apparatus is wherein each of the first and second pressure distribution plates comprises a plurality of pressure transfer elements which are pivotally mounted to the pressure distribution plates. Each pressure transfer element comprises a contact area which is adapted to locally contact an outer surface area of the bridging element, which matches the position of an associated electrical contact surface of the first and second lateral connecting portions. In other words, the pressure transfer elements are exclusively located at the lateral and vertical position where the electrical contact surfaces of the bridging element and the associated electrical contact surfaces of the first and second lateral connecting portions of the busbars are located.

The apparatus has the advantage that due to the local application of the clamping pressure in combination with the pivotable suspension of the pressure elements, the required contact pressure between the electric contact surfaces can be provided regardless of any manufacturing tolerances of the busbar. Moreover, the apparatus has the further advantage that even a certain misalignment of the two adjoining busbars can be compensated for, which might be caused by a long-term settlement of the material or the ground and switchboard cabinets in which the busbars are installed.

Even a further advantage can be seen in that due to the forces only being applied in a local area, which has the lateral extension of about the lateral extension of the electrical contact surfaces of the bridging element and the associated electrical contact surfaces of the busbars, no other sections of the busbars except the lateral connecting portions are exerted to any clamping pressure which might cause the insulating material to creep over a longer period of time.

According to another object of the present invention, the first and second pressure distribution plate advantageously extend from the first bus bar to the second bus bar, thereby spanning spans the bridging element. The distribution plates are made of a rigid and preferably electrically insulating material like fiber reinforced plastics which keeps its shape under pressure over time. Alternatively, the distribution plates may be made of metal which is covered with an electrically insulating coating material, preferably plastics. The pressure distribution plates may have a width which is smaller, e.g. only 50% or less of its length which spans the bridging element, in order to provide a larger number of pressure distribution plates each of which is only clamped by one tensioning bolt, along the length of the shipping splits. This provides for an increased flexibility of the mechanical clamping connection.

According to a preferred embodiment of the invention, the pressure transfer elements are mounted to linking elements which are pivotally arranged at the first and/or second pressure distribution plate. This provides for the advantage that the pressure elements can be easily adapted to different busbar designs by replacing the linking elements. Although the number of pressure transfer elements may be larger, there are preferably two pressure transfer elements mounted to each linking element. This allows for an increased compensation of distance variations between the adjoining busbars, which are electrically connected by the apparatus.

According to another object of the invention, two linking elements are arranged at the first and second pressure distribution plate at equal distance from the center of the tensioning bolt on opposite sides thereof. This provides for a maximum articulousness of the pressure transfer elements when contacting the outer surface of the bridging element.

In the preferred embodiment of the invention each linking element comprises a housing to which the pressure transfer elements are pivotally mounted. The housing comprises an outer surface, which is located on the side which is arranged opposite of the pressure transfer elements. In this embodiment, the first and/or second pressure distribution plate comprises a pocket with an inner surface, which is adapted to contact the outer surface of the housing. In order to provide for a rolling engagement of the outer surface relative to the inner surface, one of the outer surface and the inner surface, preferably the outer surface of the housing of the linking element, has a convex shape. The other mating surface may also have a convex shape, but preferably has an even shape. Alternatively, the shape may be concave, but with a lager radius of curvature than the mating convex surface. Due to the rolling engagement of the linking elements in the pockets of the associated pressure distribution plate, an even distribution of the force applied by the tensioning bolt to each linking element is obtained, which reduces the danger of mechanical stress leading to cracks in the material of the busbars and/or the bridging element. The pockets may be provided as slots or notches which are formed in each pressure distribution plate, into which the housing of the linking elements may be slid sidewardly when assembling the apparatus.

In order to allow for an even more easy assembly of the apparatus, the pressure transfer elements are preferably received in slot shaped openings, which are formed in the housing of an associated linking element.

For mounting the pressure transfer elements to a linking element, the pressure transfer elements may have a mushroom-type head, whereas each of the slot shaped openings comprises an extended section for receiving and retaining the mushroom-type head when sidewardly sliding a pressure transfer element into an associated slot shaped opening. This design of the apparatus provides for an additional degree of freedom of the combined linkage which in turn increases the flexibility of the mechanical connection and makes sure that the forces are applied to the electrical contact surfaces of the bridging element and the associated electrical contact surfaces of the busbars in a direction which is perpendicular to the outer surface of the busbars.

According to an even more sophisticated embodiment of the invention, which allows for an easy and fast assembly, the pockets are formed as notches having a T-shaped opening, and the housings of the linking elements comprise an extended head portion at which the outer surface is formed which is adapted to be received and retained in the notches. In the same way as described herein before with regard to the shape of the pockets formed in the first and second pressure distribution plates, and the housing of the linking elements, the notches may be open at one side so that the head of the pressure transfer elements can be sidewardly slid into the notches when assembling the apparatus.

According to yet another object of the invention, a switch gear cabinet which includes a first and a second laminated multi-phase busbar as described herein before comprises an apparatus as described herein, which mechanically and electrically connects the first and second lateral connecting portion of the busbars.

Figure 1:
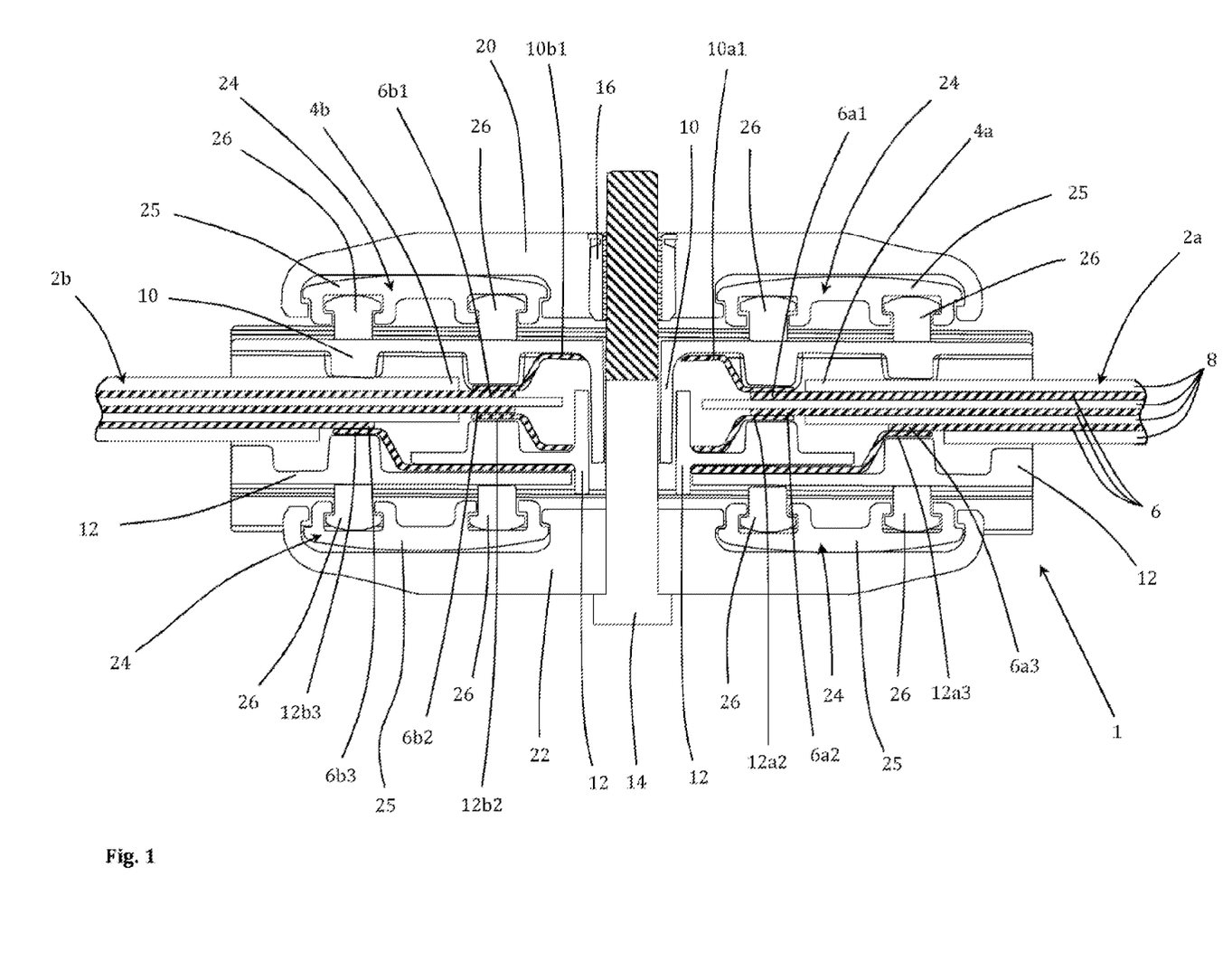
FIG. 1 is a schematic cross sectional side view of a first and a second busbar which are interconnected by an apparatus of the present invention.

As it is shown in FIG. 1, a first laminated multi-phase busbar 2a and a second laminated multi-phase busbar 2b include a plurality of conducting copper layers 6 and insulating layers 8, which are arranged above and below as well as between the conducting layers 6. The conducting layers 6 of the first laminated multi-phase busbar 2a, which may be accommodated in a first switch gear cabinet, project from the insulating layers 8 and form a first lateral connecting portion 4a with first electrical contact surfaces 6a1 to 6a4. In the same way, the conducting layers 6 of the second laminated multi-phase busbar 2b, which may be accommodated in a second or the same switch gear cabinet project from the insulating layers 8 thereof, so as to form a second lateral connecting portion 4b with second electrical contact surfaces 6b1 to 6b4.

As it can be further seen from FIGS. 1 to 4, the apparatus 1 comprises a bridging element 10, 12, which comprises a plurality of laminated insulating layers 8 and conducting layers 6 having contact surfaces 10a1, 10b1; 12a2, 12b2; 12a3, 12b3 which are adapted to contact the associated contact surfaces 6a1-6a4; 6b1-6b4 of the first and second lateral connecting portions 4a, 4b of the first and second busbars 2a, 2b.

The apparatus 1 further comprises a first pressure distribution plate 20 which is adapted to be arranged on a first side of the busbars 2a, 2b and a second pressure distribution plate 22 which is adapted to be located on a second side of the busbars 2a, 2b. A tensioning bolt 14 extends through a central opening, which is formed in the first and second pressure distribution plates 20, 22 and also in the bridging element 10, 12. The tensioning bolt 14 has a threaded portion, which engages in an internal thread 16, which is formed in the first pressure distribution plate 20, as it is indicated in FIG. 1, in order to urge the first and second pressure distribution plates 20, 22 towards each other when tightening/rotating the tensioning bolt 14.

As it can further be seen from FIG. 1, the each of the first and second pressure distribution plates 20, 22 comprises a plurality of pressure transfer elements 26, which are pivotally mounted to the pressure distribution plates 20, 22. Each pressure transfer element 26 comprises a contact area which is adapted to locally contact an outer surface area of the bridging element 10, 12, which matches the position of an associated electrical contact surface 6a1-6a3; 6b1-6b3 of the first and second lateral connecting portions 4a, 4b. In other words, the pressure transfer elements 26 or more precisely the contacting front surfaces of the pressure elements 26 are located over the areas where the electrical contact surfaces 10a1, 10b1; 12a2, 12b2; 12a3, 12b3 of the bridging element 10, 12 and the associated electrical contact surfaces 6a1-6a3; 6b1-6b3 of the first and second lateral connecting portions 4a, 4b of the busbars 2a, 2b are located. By means of this, the clamping force which is generated by the tensioning bolt 14 is transferred via the pressure distribution plates 20, 22 to the pressure elements 26 which in turn direct the forces into the outer surface areas of the bridging element 10, 12 and the busbar 2a, 2b, which are located in the height of the electrical contact surfaces 10a1, 10b1; 12a2, 12b2; 12a3, 12b3 of the bridging element 10, 12 and the mating electrical contact surface 6a1-6a3; 6b1-6b3 of the first and second lateral connecting portions 4a, 4b.

As it is indicated in FIG. 1, the first and second pressure distribution plates 20, 22 extend from the first bus bar 2a to the second bus bar 2b and span the bridging element 10, 12. The distribution plates 20, 22 are made of a rigid and preferably electrically insulating material like fiber reinforced plastics, which keeps its shape under pressure over time.

Figure 2:
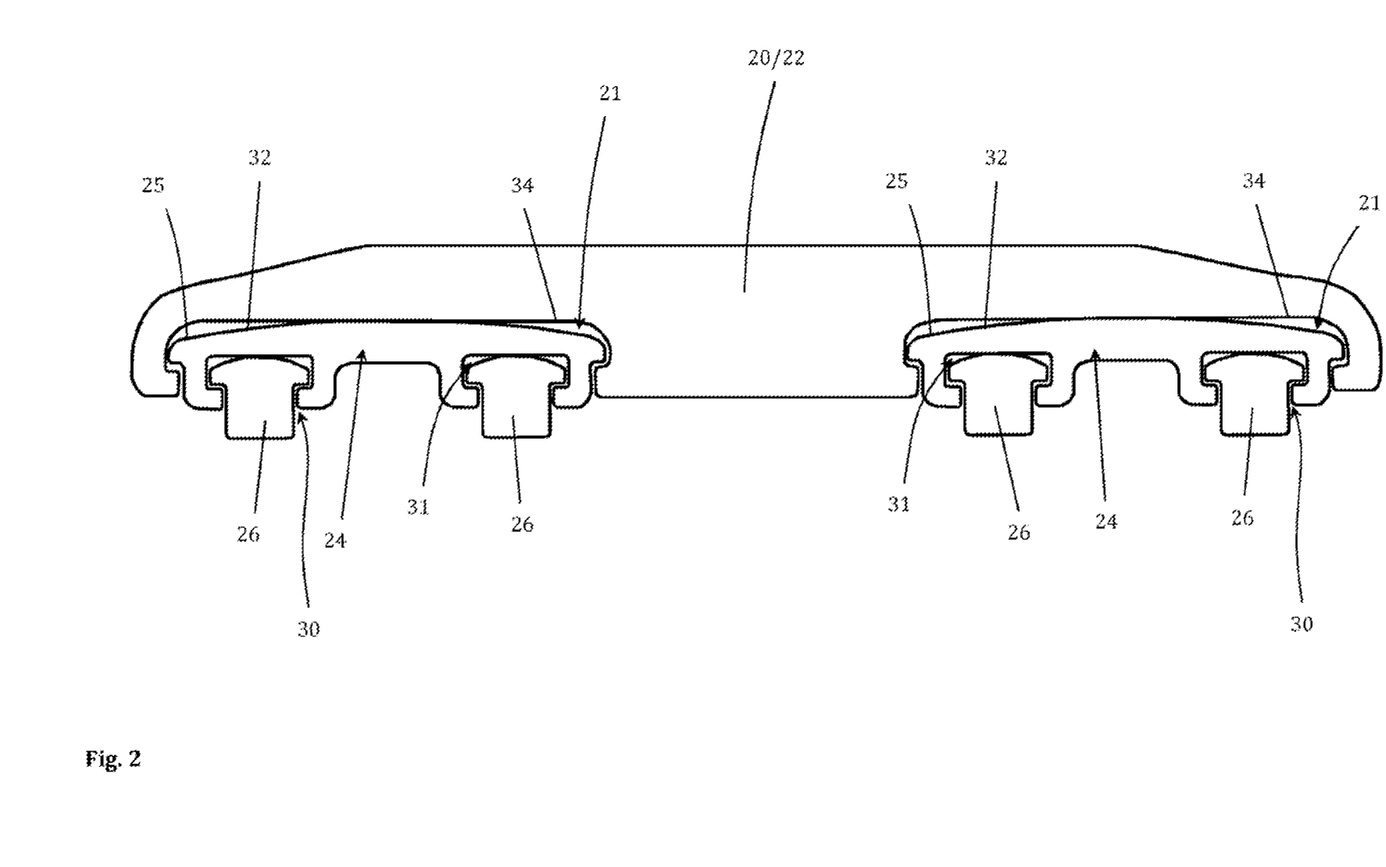
FIG. 2 is a schematic cross sectional view of a pressure distribution plate with mounted linking elements and pressure transfer elements used in an apparatus according to the present invention.

The pressure transfer elements 26, which are manufactured from the same material as the pressure distribution plates 20, 22 are mounted to linking elements 24, which are pivotally arranged at the first and second pressure distribution plate 20, 22, as it is shown in FIGS. 1 and 2. Although the number of pressure transfer elements may be larger, there are preferably two pressure transfer elements 26 mounted at each linking element 24. The linking elements 24 are advantageously mounted to the first and second pressure distribution plate 20, 22 equidistantly from the center of the tensioning bolt 14 and at a radial distance to each other.

From FIGS. 1 and 2 it can further be seen that each linking element 24 comprises a housing 25, to which the pressure transfer elements 26 are mounted in such a way that they can be pivoted in a radial direction towards and away from the longitudinal axis of the tensioning bolt 14. To do so, the housing 25 comprises an outer convex shaped surface 32, which is located on the side opposite of the pressure transfer elements 26, and the first and second pressure distribution plate 20, 22 comprises a pocket 21, in which a complementary inner surface 34 is formed, which contacts the outer surface 32, so as to allow for a rolling engagement thereof. Due to the rolling engagement of the linking elements 24 in the pockets 21 of the associated pressure distribution plate 20, 22, the force which is centrally generated by the tensioning bolt 14 is evenly distributed to each linking element 24 which in turn locally focusses the force to the pressure transfer elements 26. As it is indicated in FIG. 3, the pockets 21 are preferably provided as slots or notches which are formed in each pressure distribution plate 20, 22, into which the housing 25 of the linking elements 24 may be slid sidewardly from one side when assembling the apparatus 1.

In order to further simplify the assembling process of the apparatus 1, the pressure transfer elements 26 are received in slot shaped openings 30 too which are formed in the housing 25 of an associated linking element 24, as it is shown in FIGS. 1 to 4.

Figure 3:
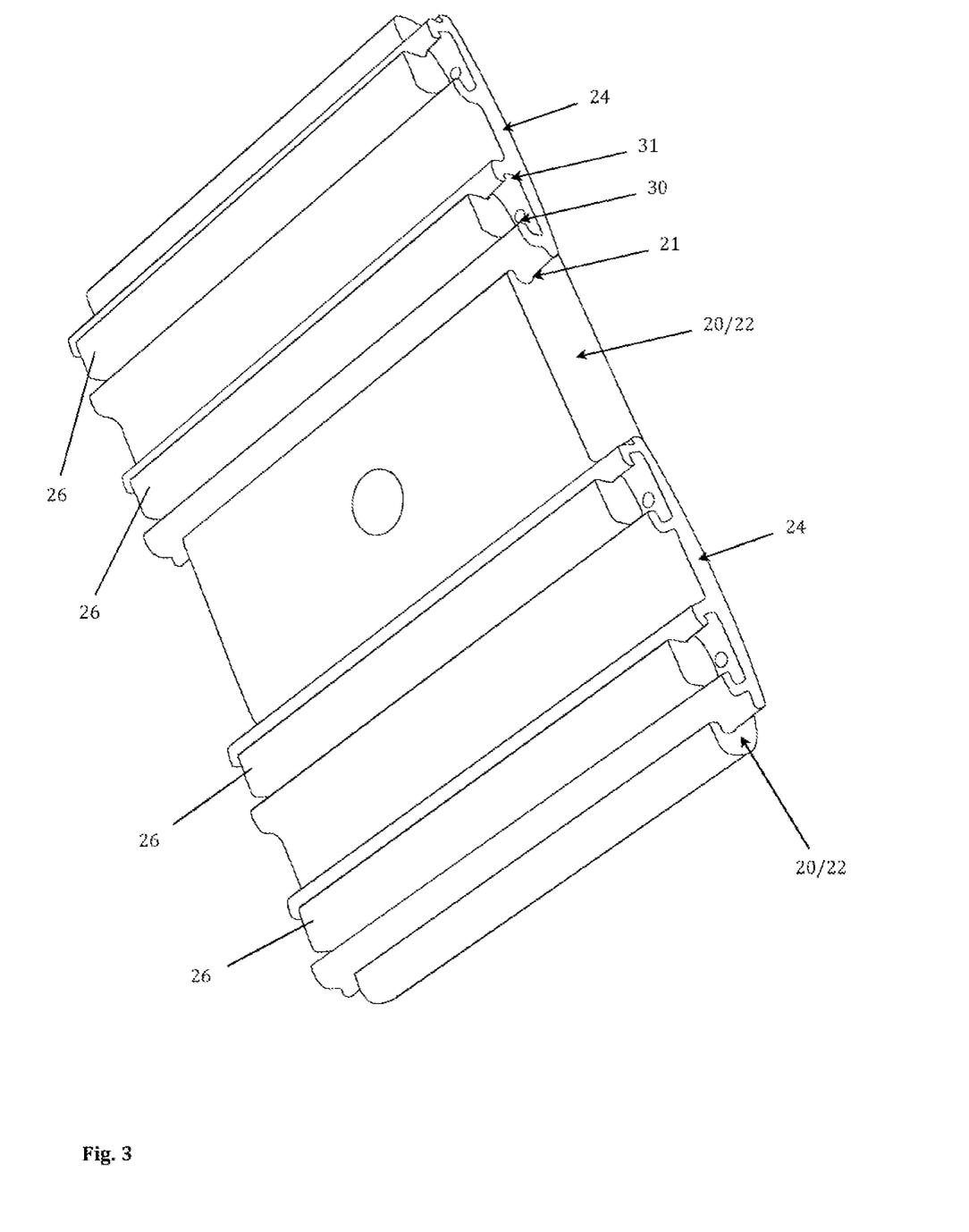
FIG. 3 is 3-dimensional view of the bottom side of a pressure distribution plate of FIG. 2.
Figure 4:
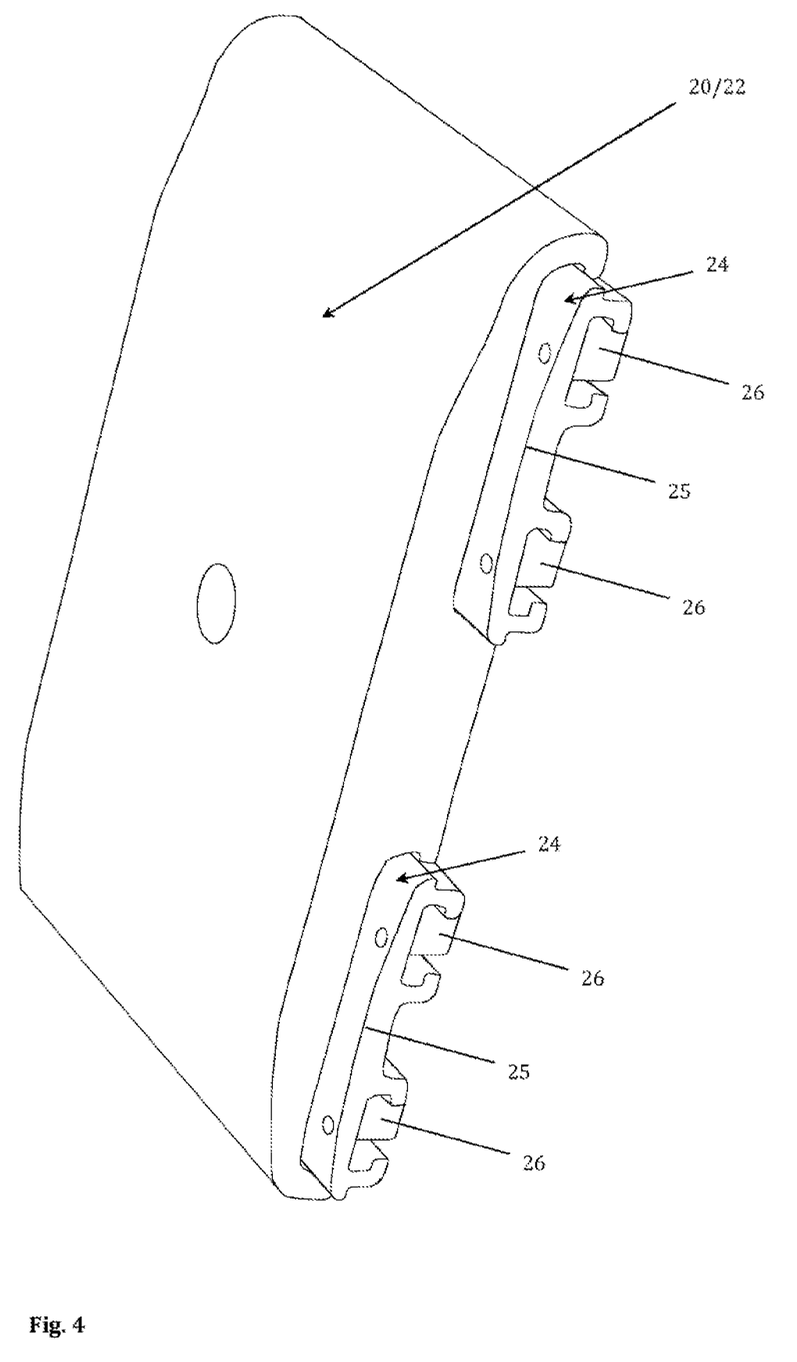
FIG. 4 is 3-dimensional top view of the pressure distribution plate of FIG. 2.

As it is further shown in FIG. 3, the pressure transfer elements 26 have an elongated shape and a mushroom-type head, whereas each of the slot shaped openings 30 comprises a complementary elongated extended section 31 for receiving and retaining the mushroom-type head when sidewardly sliding a pressure transfer element 26 into an associated slot shaped opening 30. In the same way as the linking elements 24 also the pressure transfer elements 26 can be provided as an elongated strip or profile which is received in a slot shaped opening 30.

In the embodiment of the invention which is shown in FIGS. 1 to 4, there is a first bridging element arranged on the front side and a second bridging element arranged on the back side of the busbars 2a, 2b, each of which is composed of two complementary sub-bridging elements 10, 12, which may be loosely connected to each other and urged against each other by the tensioning bolt 14, which extends through an associated central hole formed in each of the sub-bridging elements 10, 12. This design of the bridging elements allows for an easy adaption to the bridging elements to different busbar/shipping split constructions.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LISTING OF REFERENCE NUMERALS 1 apparatus
2a first laminated multi-phase busbar
2b second laminated multi-phase busbar
4a first lateral connecting portion
4b second lateral connecting portion
6 conducting layers of first and second busbar
6a1-6a3 first contact surfaces of conducting layers
6b1-6b3 second contact surfaces of conducting layers
8 insulating layers of first and second busbar
10 first bridging element
10a1 first outer clamping section at bridging element
10b1 second outer clamping section at bridging element
12 second bridging element
12a2,3 first outer clamping section at bridging element
12b2,3 second outer clamping section at bridging element
14 tensioning bolt
16 inner thread
20 first pressure distribution plate
21 pocket of the pressure distribution plate
22 second pressure distribution plate
24 linking element
25 housing of the linking element
26 pressure transfer element
30 slot shaped opening of the linking element
31 extended section of the slot shaped opening
32 outer surface of the linking element housing
34 inner surface of the pocket

What is claimed is:

1. An apparatus for electrically connecting busbars, comprising:
a first laminated multi-phase busbar configured to be connected to a second laminated multi-phase busbar, each of the first and second laminated multi-phase busbars including a plurality of conducting layers and insulating layers which are arranged between the conducting layers, the conducting layers of the first laminated multi-phase busbar projecting from the insulating layers thereof, forming a first lateral connecting portion with first electrical contact surfaces, and the conducting layers of the second laminated multi-phase busbar projecting from the insulating layers thereof, forming a second lateral connecting portion with second electrical contact surfaces;

a bridging element that includes a plurality of laminated insulating layers and conducting layers having electrical contact surfaces which are configured to contact associated electrical contact surfaces of the first and second lateral connecting portions of the first and second busbar;

a first pressure distribution plate configured to be arranged on a first side of the busbars;

a second pressure distribution plate configured to be arranged on a second side of the busbars; and a tensioning bolt configured to extend through a central opening formed in the first and second pressure distribution plates and the bridging element, configured to urge the first and second pressure distribution plates towards each other, wherein the first and second pressure distribution plates each comprise a plurality of pressure transfer elements which are pivotally mounted to the pressure distribution plates, and wherein each pressure transfer element comprises a contact area configured to locally contact an outer surface area of the bridging element which matches a position of an associated electrical contact surface of the first and second lateral connecting portions.

2. The apparatus according to claim 1, wherein each of the first and second pressure distribution plates extends from the first bus bar to the second bus bar and spans the bridging element.

3. The apparatus according to claim 2, wherein the pressure transfer elements are mounted to linking elements which are pivotally arranged at the first and/or second pressure distribution plate.

4. The apparatus according to claim 3, wherein at least two of the pressure transfer elements are mounted at each of the linking elements.

5. The apparatus according to claim 2, wherein two of the linking elements are arranged on opposite sides of the tensioning bolt at the first and second pressure distribution plates.

6. The apparatus according to claim 3, wherein each of the linking elements comprises a housing to which the pressure transfer elements are mounted, the housing having an outer surface which is located opposite the pressure transfer elements, wherein the first and/or second pressure distribution plate comprises a pocket with an inner surface which is configured to contact the outer surface, and wherein one of the outer surface and the inner surface has a convex shape so as to allow for a rolling engagement of the outer surface relative to the inner surface.

7. The apparatus according to claim 6, wherein the pressure transfer elements are received in slot shaped openings which are formed in the housing of the linking elements.

8. The apparatus according to claim 7, wherein the pressure transfer elements have a mushroom-type head, and wherein each of the slot shaped openings comprises an extended section configured to receive and retain the mushroom-type head when sliding the pressure transfer elements into the slot shaped opening.

9. The apparatus according to claim 6, wherein the pockets comprise notches having a T-shaped opening, and wherein the housings of the linking elements each comprise an extended head portion on which the outer surface is formed which is configured to be received and retained in the notches.

10. A switch gear cabinet, comprising:

a first laminated multi-phase busbar; and a second laminated multi-phase busbar, wherein the first and second laminated multi-phase busbars are electrically connected by the apparatus according to claim 1.

\* \* \* \* \*